(12) United States Patent
Ashiura et al.

(10) Patent No.: US 7,589,155 B2
(45) Date of Patent: Sep. 15, 2009

(54) MODIFIED BUTYL RUBBER COMPOSITION

(75) Inventors: Makoto Ashiura, Hiratsuka (JP); Tetsuji Kawazura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 46 days.

(21) Appl. No.: 11/583,722

(22) Filed: Oct. 20, 2006

(65) Prior Publication Data

US 2007/0093607 A1  Apr. 26, 2007

(30) Foreign Application Priority Data

Oct. 21, 2005 (JP) .............................. 2005-307354
Feb. 3, 2006 (JP) .............................. 2006-027509
May 10, 2006 (JP) .............................. 2006-131780

(51) Int. Cl.
*C08F 251/00* (2006.01)
(52) U.S. Cl. ................................................... 525/260
(58) Field of Classification Search ............... 525/260
See application file for complete search history.

(56) References Cited

U.S. PATENT DOCUMENTS 4,130,534 A * 12/1978 Coran et al. ................ 525/133

2002/0165325 A1  11/2002  Ashiura et al.
2005/0222343 A1  10/2005  Ashiura et al.

FOREIGN PATENT DOCUMENTS

JP       6-172547 A    6/1994
WO    2005/063896 A2   7/2005

* cited by examiner

*Primary Examiner*—Edward J Cain
(74) *Attorney, Agent, or Firm*—Connolly Bove Lodge & Hutz LLP

(57) ABSTRACT

A modified butyl rubber composition including a modified butyl rubber obtained by reacting a compound (a) having, in its molecule, a nitroxide free radical stable at an ordinary temperature in the presence of oxygen, a radical initiator (b), and a bifunctional or higher radical polymerizable monomer (c) or a modified butyl rubber composition containing a modified butyl rubber, obtained by reacting a compound (a) having, in its molecule, a nitroxide free radical stable at ordinary temperature in the presence of oxygen and a radical initiator (b), into which a bi- or more-functional radical polymerizable monomer (c) is compounded.

18 Claims, 3 Drawing Sheets

MODIFIED BUTYL RUBBER COMPOSITION

This application is a claims priority from Japanese Applications 2005-307354, filed Oct. 21, 2005, 2006-027509 filed Feb. 3, 2006 and 2006-131780 filed May 10, 2006.

FIELD OF THE INVENTION

The present invention relates to a modified butyl rubber composition and more specifically relates to a modified butyl rubber composition capable of being cross-linked with an organic peroxide and a method for improving a tan δ of a butyl rubber.

BACKGROUND OF THE INVENTION

Butyl rubber is extremely low in unsaturation degree, and therefore, is excellent in weatherability, heat resistance, ozone resistance, etc. and is also low in air permeability. Thus, butyl rubber is suitable for use as a sealant, adhesive, etc. Therefore, as methods for cross-linking the butyl rubber, sulfur cross-linking, quinoid cross-linking, resin cross-linking, etc. are known, but currently it is hard to say that any method is satisfactory in practice. That is, sulfur cross-linking requires cross-linking at a high temperature over a long time. Further, quinoid cross-linking usually uses toxic red lead oxide as an oxidizing agent to activate the quinoid, and therefore has problems in terms of environment safety. Further, resin cross-linking has a remarkably slow reaction rate and requires heating at a high temperature over a long time. Thus, the product is liable to be in a state not completely cross-linked, therefore there is the problem that, during use, a cross-linking reaction is liable to proceed and the physical properties are liable to greatly change. Further, among the methods of cross-linking a diene-based rubber etc., cross-linking by organic peroxide, which is extremely excellent in heat resistance, is almost never used as a method for cross-linking butyl rubber. This is because, if this cross-linking is applied to butyl rubber, the decomposition reaction of the main chain is liable to proceed with priority and the resultant product is liable to be softened rather than the cross-linking. On the other hand, partially cross-linked butyl rubber is commercially available as a butyl rubber capable of being subjected to peroxide cross-linking, but this has the problem of insufficient processability. Further, Japanese Patent Publication (A) No. 6-172547 discloses a method of cross-linking uncross-linked butyl rubber in the presence of an organic peroxide and a polyfunctional monomer containing an electron attractive group, but, according to this method, severe reversion is liable to occur.

SUMMARY OF THE INVENTION

Accordingly, an object of the present invention is to enable ordinary butyl rubber, which is excellent in weatherability, heat resistance, ozone resistance, etc. and is low in air permeability, to be cross-linked with an organic peroxide.

The object of the present invention is also to provide a method for increasing a tan δ of a butyl rubber having various excellent properties and improving a damping property.

In accordance with the present invention, there is provided a modified butyl rubber composition comprising a modified butyl rubber obtained by modifying a butyl rubber by reacting a compound (a) having, in the molecule thereof, a nitroxide free radical which is stable at an ordinary temperature in the presence of oxygen, a radical initiator (b) and a bi- or more-functional radical polymerizable monomer (c).

In accordance with the present invention, there is also provided a modified butyl rubber composition comprising (i) a modified butyl rubber obtained by reacting a compound (a) having, in the molecule thereof, a nitroxide free radical, which is stable at an ordinary temperature in the presence of oxygen and a radical initiator (b) and (ii) a bi- or more-functional radical polymerizable monomer (c) compounded thereto.

According to the present invention, a modified butyl rubber composition comprising modified butyl rubber obtained by modifying a butyl rubber by reacting a compound (a) having, in the molecule thereof, a nitroxide free radical stable at an ordinary temperature even in the presence of oxygen such as a TEMPO derivative, a radical initiator (b) and a bi- or more-functional radical polymerizable monomer (c) for modification enables effective cross-linking with an organic peroxide and can increase the tan δ of the butyl rubber and improve the damping property.

According to the present invention, further, by adding a compound (a) having, in its molecule, a nitroxide free radical stable at an ordinary temperature even in the presence of oxygen such as a TEMPO derivative and a radical initiator (b) to an ordinary butyl rubber for reaction, then not only reacting a bi- or more-functional radical polymerizable monomer, but also adding a radical polymerizable monomer (c) and an organic peroxide for reaction to the modified butyl rubber to which said compound having a nitroxide free radical in its molecule is grafted, the same cross-linking reaction proceeds.

BEST MODE FOR CARRYING OUT THE INVENTION

The inventors engaged in intensive studies to enable ordinary butyl rubber to be cross-linked with an organic peroxide and, as a result, discovered that the above objects can be achieved by using a modified butyl rubber composition comprising a modified butyl rubber obtained by reacting a compound (a) having, in its molecule, a nitroxide free radical stable at ordinary temperature even in the presence of oxygen such as a TEMPO derivative, a radical initiator (b) and a bi- or more-functional radical polymerizable monomer (c) for modification, or using a modified butyl rubber composition comprising a modified butyl rubber obtained by reacting a compound (a) having, in its molecule, a nitroxide free radical stable at an ordinary (or room) temperature even in the presence of oxygen with a radical initiator (b) are reacted, followed by comprising a bi- or more-functional radical polymerizable monomer.

The butyl rubber modified by the first and second aspects of the present invention is a copolymer rubber of isobutylene called butyl rubber (IIR) and a small amount (for example 0.6 to 2.5 mol % of the rubber as a whole) of isoprene or the derivative thereof such as chlorinated butyl rubber, brominated butyl rubber, etc., which are well known in the art. There are a large number of such products on the market.

The compound (a) having, in its molecule, a nitroxide radical stable at an ordinary temperature (or room temperature) in the presence of oxygen used in the first and second aspects of the present invention is not limited thereto, but the following compounds may be illustrated.

2,2,6,6- tetramethyl-1-piperidinyloxy (Tempo)

4-oxo Tempo

General Formula

In the above formulae (1) to (6), R is a $C_1$ to $C_{30}$ alkyl group, allyl group, amino group, isocyanate group, hydroxyl group, thiol group, vinyl group, epoxy group, thirane group, carboxyl group, carbonyl group-containing group (for example, succinate anhydride, maleate anhydride, glutamate anhydride, phthalate anhydride, and other cyclic acid anhydrides), amide group, ester group, imide group, nitrile group, thiocyan group, $C_1$ to $C_{20}$ alkoxy group, silyl group, alkoxysilyl group, nitro group, or other organic group including a functional group.

4-phenyl TEMPO      4-methyl TEMPO

4-ethyl TEMPO      4-chloro-TEMPO 4-phenoxy TEMPO

4-methoxy TEMPO      4-ethoxy TEMPO

4-benzoyl TEMPO

-continued

Other examples are as follows:

-continued

X; Br or Cl

X; Br or Cl 4-amino-2,2,6,6-tetramethylpiperidinyloxy-TEMPO   4-hydroxy-TEMPO   4-isocyanate-TEMPO -continued The amount of use of the compound (a) used in the first and second aspects of the present invention is not particularly limited, but is preferably 0.001 to 0.5 mole, more preferably 0.005 to 0.1 mole, based upon 100 g of the butyl rubber to be modified. If the amount of use is small, the amount of modification of the butyl rubber is liable to be decreased, while conversely if large, the subsequent cross-linking is liable not to proceed.

As the radical initiator (b) usable in the first and second aspects of the present invention, it is possible to use any radical initiator capable of introducing said compound (a) into the molecular chain of the butyl rubber, specifically benzoyl peroxide, t-butyl peroxybenzoate, dicumyl peroxide, t-butylcumyl peroxide, di-t-butyl peroxide, 2,5-dimethyl-2, 5-di-t-butyl peroxyhexane, 2,5-dimethyl-2,5-di-t-butyl peroxy-3-hexine, 2,4-dichlorobenzoyl peroxide, di-t-butylperoxy-di-isopropylbenzene, 1,1-bis(t-butylperoxy)-3,3,5-trimethyl cyclohexane, n-butyl-4,4-bis(t-butylperoxy) valerate, 2,2-bis(t-butylperoxy)butane, diisobutyl peroxide, cumylperoxy neodecanate, di-n-propylperoxy dicarbonate, diisopropylperoxy dicarbonate, di-sec-butylperoxy dicarbonate, 1,1,3,3-tetramethylbutylperoxy neodecanate, di(4-t-butylcyclohexyl)peroxy dicarbonate, 1-cyclohexyl-1-methylethylperoxy neodecanate, di(2-ethoxyethyl)peroxy dicarbonate, di(2-ethoxyhexyl)peroxy dicarbonate, t-hexylperoxy neodecanate, dimethoxybutylperoxy dicarbonate, t-butylperoxy neodecanate, t-hexylperoxy pivalate, t-butylperoxy pivalate, di(3,5,5-trimethylhexanoyl)peroxide, di-n-octanoyl peroxide, dilauroyl peroxide, distearoyl peroxide, 1,1,3,3-tetramethylbutylperoxy-2-ethylhexanoate, disuccinate peroxide, 2,5-dimethyl-2,5-di(2-ethylhexanoylperoxy) hexane, t-hexylperoxy-2-ethyl hexanoate, di(4-methylbenzoyl) peroxide, t-butylperoxy-2-ethyl hexanoate, di(3-methylbenzoyl) peroxide, mixtures of benzoyl(3-methylbenzoyl) peroxide and dibenzoyl peroxide, dibenzoyl peroxide, t-butylperoxy isobutylate, etc. may be mentioned. Further, as typical initiators among initiators able to break down at a low temperature by a redox catalyst, dibenzoyl peroxide, paramethane hydroperoxide, diisopropylbenzene hydroperoxide, 1,1,3,3-tetramethylbutyl hydroperoxide, cumen hydroperoxide, t-butyl hydroperoxide, etc. may be mentioned. By adding these into the reaction system (mixture system, contacting system), it is possible to generate carbon radicals at the butyl rubber. By reacting a compound (a) having stable free radicals with the carbon radicals, a modified butyl rubber is obtained.

The amount of use of the radical initiator (b) used in the first and second aspects of the present invention is not particularly limited, but is preferably 0.001 to 0.5 mole, more preferably 0.005 to 0.2 mole, based upon 100 g of the butyl rubber to be modified. If the amount used is too small, the amount of hydrogen atoms taken from the butyl rubber chain is liable to become lower, while conversely if too large, the main chain of the butyl rubber is liable to break down and the molecular weight is liable to be greatly decreased.

The bi- or more-functional radical polymerizable monomer (c) usable in the first and second aspects of the present invention is not particularly limited, but, for example, includes ethylene di(meth)acrylate (here, the expression "ethylene di(meth)acrylate" includes both ethylene dimethacrylate and ethylene diacrylate. Same below even for different compounds), trimethylolpropane tri(meth)acrylate, ethyleneglycol di(meth)acrylate, polyethyleneglycol di(meth)acrylate, 1,6-hexanediol di(meth)acrylate, tetramethylolmethane tri(meth)acrylate, tetramethylolmethane tetra(meth)acrylate, tris(2-hydroxyethyl)isocyanulate tri(meth) acrylate, ethoxylated trimethylolpropane tri(meth)acrylate, pentaerithritol tri(meth)acrylate, ethoxylated trimethylolpropane tri(meth)acrylate, propoxylated trimethylolpropane (meth)acrylate, propoxylated glyceryl(meth)acrylate, pentaerithritol tetra(meth)acrylate, ditrimethylolpropane tetra (meth)acrylate, dipentaerithritol penta(meth)acrylate, ethoxylated pentaerithritol tetra(meth)acrylate, polysiloxane di(meth)acrylate, various types of urethane(meth)acrylate, various types of metal (meth)acrylate, polypropyleneglycol di(meth)acrylate, N,N'-phenylene dimaleimide, bismaleimide diphenylmethane, N,N'-phenylenediacrylamide, divinylbenzene, triallyl isocyanulate, etc. may be mentioned. Among these, a monomer including an electron attractive group in the molecule (for example, a carbonyl group (ketone, aldehyde, ester, carboxylic acid, carboxylates, amide), nitro group, cyano group, etc.) is preferable from the viewpoint of increasing the modification rate.

The amount of use of said bi- or more-functional (e.g, tri-, tetra-, or more functional) polymerizable monomer (c) is not particularly limited, but preferably is 0.001 to 0.5 mole, more preferably 0.005 to 0.2 mole, based upon 100 g of the butyl rubber to be modified. If the amount of use is too small, the subsequent cross-linking is liable not to proceed, while if too large, the cross-linked product is liable to be decreased in the physical properties.

In the first aspect of the present invention, the method of modifying a butyl rubber with said compound (a), initiator (b) and monomer (c) is not particularly limited. For example, it can be modified as follows. A premixed mixture of butyl rubber, the compound (a) and the initiator (b) can be reacted in an internal mixer, in which the air is substituted with nitrogen at a temperature of 150 to 220° C. and then, the temperature is once decreased, charged with the monomer (c), the air again substituted by nitrogen, and mixed and reacted at a temperature of 150 to 220° C. to obtain the desired modified butyl rubber composition. Further, the butyl rubber, the compound (a), initiator (b) and the monomer (c) can be simultaneously mixed and reacted. Note that this modification can be performed using a twin-screw extruder, single-screw extruder, rolls, etc.

On the other hand, in the second aspect of the present invention, the method of modifying the butyl rubber and the method of mixing the radical polymerizable monomer (c) thereto are not particularly limited, but, for example, the butyl rubber may be modified in the same way as the method of reacting the compound (a) and initiator (b) in the first aspect. The monomer (c) may be mixed by using a general method or may be simultaneously mixed with various types of additives, reinforcing fillers, and cross-linking agents. The modification and mixing may be performed by an internal mixer, twin-screw extruder, single-screw extruder, rolls, Banbury mixer, kneader, etc.

The rubber composition according to the first and second aspects of the present invention may contain therein, based upon 100 parts by weight of the rubber ingredient including the modified butyl rubber, 5 to 300 parts by weight, preferably 30 to 200 parts by weight, of a reinforcing filler such as carbon black and/or silica and preferably 0.05 to 15 parts by weight, more preferably 0.1 to 10 parts by weight, of a cross-linking agent (for example, benzoyl peroxide, t-butylperoxy benzoate, dicumyl peroxide, t-butylcumyl peroxide, di-t-butyl peroxide, 2,5-dimethyl-2,5-di-t-butyl peroxyhexane, 2,5-dimethyl-2,5-di-t-butyl peroxy-3-hexine, 2,4-dichlorobenzoyl peroxide, di-t-butylperoxy-di-isopropyl benzene, 1,1-bis(t-butylperoxy)-3,3,5-trimethylcyclohexane, n-butyl-4,4-bis(t-butylperoxy)valerate, 2,2-bis(t-butylperoxy)butane, or another organic peroxide and azodicarbonamide, azobisisobutylonitrile, 2,2'-azobis-(2-amidinopropane)dehydrochloride, dimethyl-2,2'-azobis(isobutylate), azobis-cyanovalerate, 1,1'-azobis-(2,4-dimethylvaleronitrile), azobismethylbutyronitrile, 2,2'-azobis-(4-methoxy-2,4-dimethylvaleronitrile), or other azo-based radical initiator etc.).

The modified butyl rubber composition according to the first and second aspects of the present invention may contain therein another rubber ingredient such as a styrene-isoprene-butadiene copolymer, chloroprene rubber, ethylene-propylene-diene three-way copolymer rubber, ethylene-propylene copolymer, ethylene-propylene-butene three-way copolymer, styrene-butadiene-styrene block copolymer, styrene-isoprene-styrene copolymer, styrene-ethylene-butene-styrene block copolymer, styrene-ethylene-propylene-styrene copolymer, polyethylene, polypropylene, polystyrene, polyaromatic vinyl, polyolefin, polyisoprene, various types of styrene-butadiene copolymers, various types of polybutadienes, an acrylonitrile-butadiene copolymer, hydrogenated acrylonitrile-butadiene copolymer, acryl rubber, silicone rubber, fluororubber, epichlorohydrin rubber, various types of polymethacrylic acid esters, various types of polyethers, various types of polysulfides, various types of polyvinyl ethers, various types of polyesters, various types of polyamides, cellulose, starch, various types of polyurethanes, various types of polyureas, various types of polyamines, etc. It is preferable that the amount of the modified butyl rubber added be at least 10% by weight of the rubber ingredient.

The rubber composition according to the first and second aspects of the present invention may contain therein, in addition to the above ingredients, other fillers, vulcanization or cross-linking agents, vulcanization or cross-linking accelerators, various types of oil, antioxidants, plasticizers, and other various types of additives generally compounded into tire use and other rubber compositions. The additives may be mixed by a general method to form a composition for vulcanization or cross-linking. The amounts of these additives added may be made the conventional general amounts added so long as this does not adversely affected to the object of the present invention.

EXAMPLE

Examples will now be used to further explain the present invention, but the present invention is by no means limited to these Examples.

The materials used in the following Examples were as follows:

IIR: butyl rubber (made by Bayer, BUTYL 301)

Di-t-butylperoxide: (made by NOF Corporation, PERBUTYL D)

OH-TEMPO: 4-hydroxy-2,2,6,6-tetramethylpiperidinyl-1-oxyl (made by Asahi Denka, LA7RD)

Ethylene dimethacrylate: (made by Tokyo Kasei)

Trimethylolpropane trimethacrylate: (made by Tokyo Kasei)

Preparation Example 1 for Modified IIR
Composition (IIR-EDM)

350.0 g, of IIR, 30.4 g, of di-t-butylperoxide and 32.2 g of OH-TEMPO were charged into an internal Banbury mixer set to a temperature of 60° C. and mixed for 10 minutes. The mixture obtained was mixed in an internal Banbury mixer set to a temperature of 100° C., while substituting the air with nitrogen for 5 minutes. The mixture was mixed, while increasing the temperature to 185° C. and mixed for 20 minutes. Part of the polymer obtained was dissolved in toluene, then a reprecipitation operation was used to isolate and purify the polymer. The product thus purified was used for analysis by $^1$H-NMR, whereby the introduction of TEMPO sites (i.e., alkoxyamino groups) was confirmed. The introduction rate was 0.283 mol %, based upon the number of monomer units of the IIR. The reaction system was increased once to 150° C., then 37.0 g of ethylene dimethacrylate was added and mixed, while substituting the air with nitrogen for 5 minutes. While mixing, the temperature was increased to 185° C. and the mixture was mixed for 20 minutes. Part of the polymer obtained was dissolved in toluene, then a reprecipitation operation was used to isolate and purify the polymer. The product thus purified was used for analysis by infrared absorption spectrometry (IR analysis) and $^1$H-NMR analysis. In the IR analysis, absorption derived from a carbonyl of ester was observed near 1720 cm$^{-1}$, while with the $^1$H-NMR analysis, a signal derived from protons of ethylene was observed near 4.37 ppm and a signal derived from protons of an olefin of methacrylate was observed near 6.12 and 5.60 ppm. From these results, it was confirmed that ethylene dimethacrylate was introduced into the TEMPO introduction sites and it was confirmed that ethylene dimethacrylate was introduced into 63% of the TEMPO introduction sites.

Preparation Example 2 for Modified IIR Composition (IIR-GT)

Except for replacing the ethylene dimethacrylate with the addition of 42.1 g of trimethylolpropane trimethacrylate, the same procedure as in Preparation Example 1 was performed for preparation. The TEMPO sites were 0.259 mol %, based upon the monomer units of the IIR. The trimethylolpropane trimethacrylate inserted due to the subsequent reaction was 71%, based upon the TEMPO introduction sites.

Examples 1 to 2 and Comparative Examples 1 to 3

Figure 1:
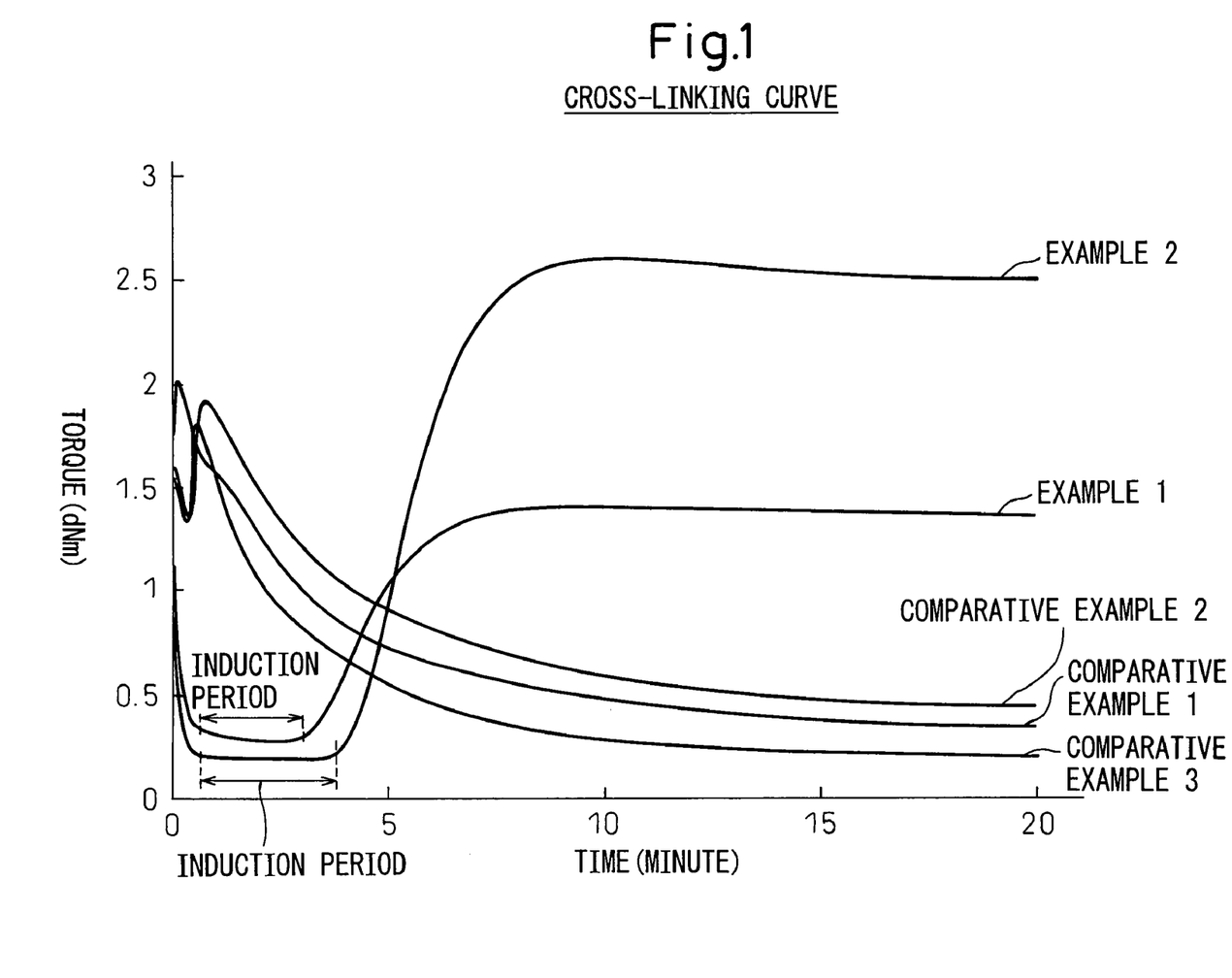
FIG. 1 is cross-linking curves showing the cross-linking characteristics of rubber compositions obtained by Examples 1 to 2 and Comparative Examples 1 to 3.
Figure 2:
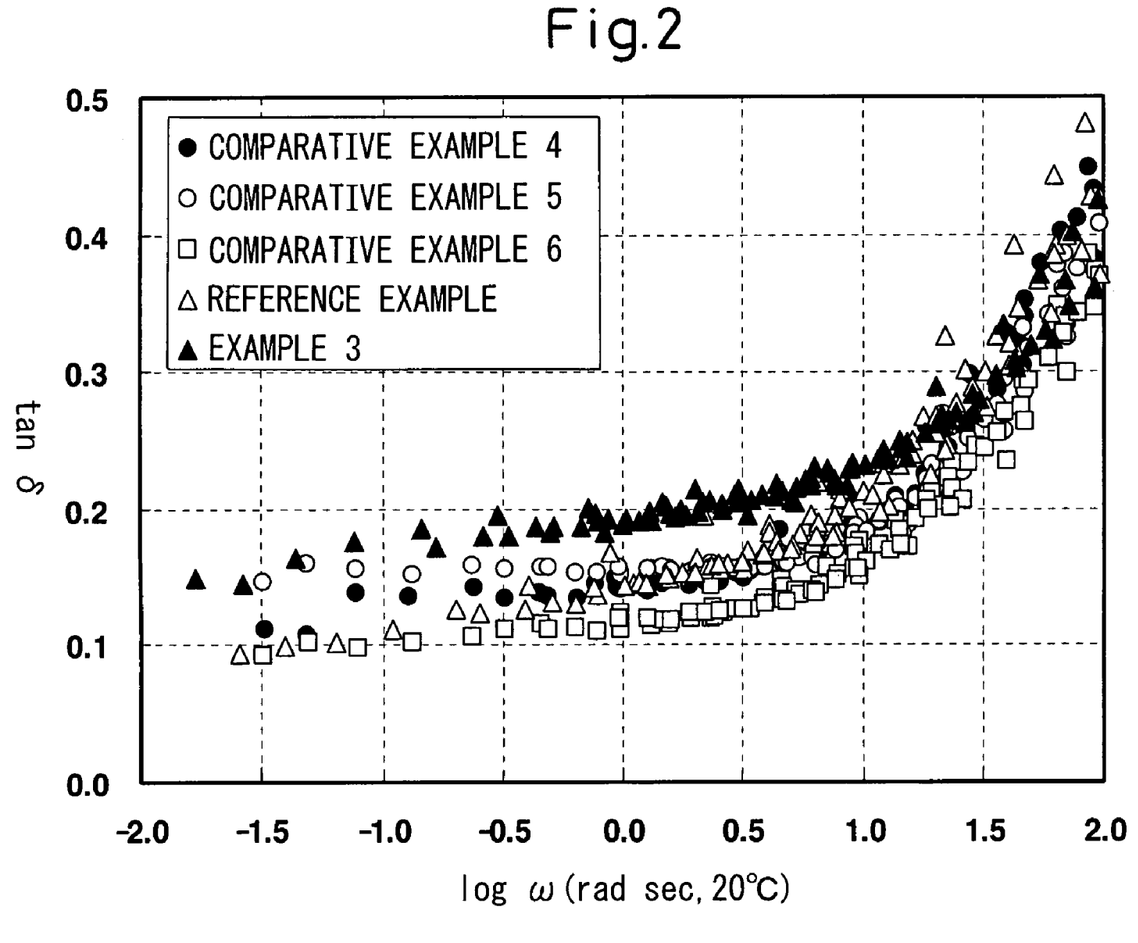
FIG. 2 shows the relationship between the tan δ (20° C.) of the rubber compositions obtained by the Reference Example, Example 3, and Comparative Examples 4 to 6 and the frequency, the results of measurement at a temperature range of 0° C. to 100° C. and a frequency range of 1 to 300 Hz converted to the tan δ of the temperature 20° C. by the temperature-time conversion rule.

The formulations shown in Table I (parts by weight) were mixed by 150 cc kneaders for 6 minutes. The mixtures were further mixed in 8-inch open rolls to obtain rubber compositions. These rubber compositions were evaluated for cross-linking characteristics by using a "FLAT DIE RHEOMETER MODEL VR-3110 (made by Uejima Seisakusho)" to measure the cross-linking (vulcanization) curve under conditions of a vibration angle of ±1° and a temperature of 170° C. The results are shown in FIG. 1. Further, these rubber compositions were press vulcanized at 170° C. for 15 minutes to form 2 mm thick sheets. No. 3 dumbbell shaped test pieces were punched out from these sheets and were subjected to tensile tests according to a method of JIS K 6251. The results are shown in Table I.

In general, when cross-linking a polymer composition such as a rubber composition, if sulfur and a sulfur cross-linking vulcanization accelerator is used, even at a cross-linkable temperature, it is possible to provide an induction period where the cross-linking reaction does not proceed for a certain time interval. The provision of this induction period is extremely preferable in that it enables rubber to be shaped without extending the time required for the cross-linking. In this regard, in an organic peroxide cross-linking system, such a induction period was usually not provided. However, according to the present invention, as shown in FIG. 1, not only does it become possible to cross-link by peroxide a butyl rubber which inherently would break down if cross-linking with an organic peroxide were attempted, but also it becomes possible to produce a rubber composition having a induction period in the case of sulfur cross-linking and cross-linking with a sulfur cross-linking vulcanization accelerator.

TABLE I

|  | Comp. Ex. 1 | Comp. Ex. 2 | Comp. Ex. 3 | Ex. 1 | Ex. 2 |
|---|---|---|---|---|---|
| Formulation (parts by weight) | | | | | |
| Reg-IIR*[1] | 100 | 100 | 100 | — | — |
| IIR-EDM*[2] | — | — | — | 117.9*[8] | — |
| IIR-GT*[3] | — | — | — | — | 121.2*[8] |
| Carbon black*[4] | 40 | 40 | 40 | 40 | 40 |
| Stearic acid*[5] | 1 | 1 | 1 | 1 | 1 |
| DCP*[6] | 2 | 2 | 4 | 8 | 8 |
| EDM*[7] | 2 | 10.6 | 10.6 | — | — |
| Condition of cross-linked rubber sheet | Sheet cannot be formed | Sheet cannot be formed | Sheet cannot be formed | Sheet can be formed | Sheet can be formed |
| Tensile strength at break (MPa) | — | — | — | 3.1 | 4.0 |
| Elongation at break (%) | — | — | — | 395 | 421 |

Note of Table I
*[1]Butyl rubber (made by Bayer, BUTYL 301)
*[2],*[3]Synthesized by the above Preparation Examples 1 and 2
*[4]ASAHI #50 (made by Asahi Carbon)
*[5]BEADS STEARIC ACID YR (made by NOF Corporation)
*[6]Dicumyl peroxide (made by NOF Corporation, PERCUMYL D)
*[7]Ethylene dimethacrylate (made by Tokyo Kasei)
*[8]Prepared so that rubber ingredient becomes 100 parts by weight Reference Example, Example 3 and Comparative Examples 4 to 6

In the formulations shown in Table II (parts by weight), the carbon black and stearic acid were added to the rubber ingredients and mixed for 6 minutes in 600 cc internal mixers. Further, the vulcanization chemicals (sulfur and subsequent chemicals of Table II) were added by 8-inch open rolls by an ordinary method and mixed to obtain rubber compositions. These rubber compositions were investigated for cross-linking properties by a rheometer test. The measurement was conducted under conditions of a vibration angle of ±1°, a test temperature of 160° C., a range of 2N·m and a test time of 60 minutes. The results are shown in Table II. Further, these rubber compositions were press vulcanized at 160° C. for 40 minutes to form 1 mm thick sheets. No. 3 dumbbell shaped test pieces were punched out from these sheets and were subjected to tensile tests before aging and after aging (120° C.×48 hours) based on JIS K 6251 at a speed of 500 mm/min. The results are shown in Table II.

TABLE II

|  | Comp. Ex. 4 | Comp. Ex. 5 | Comp. Ex. 6 | Ref. ex. | Ex. 3 |
|---|---|---|---|---|---|
| Formulation (parts by weight) | | | | | |
| Br-IIR*[1] | 100 | — | — | — | — |
| Cl-IIR*[2] | — | 100 | — | — | — |
| IIR*[3] | — | — | 100 | — | — |

TABLE II-continued

|  | Comp. Ex. 4 | Comp. Ex. 5 | Comp. Ex. 6 | Ref. ex. | Ex. 3 |
|---|---|---|---|---|---|
| IIR-OHT*[4] | — | — | — | 100 | — |
| IIR-GT*[5] | — | — | — | — | 100 |
| Carbon black*[6] | 50 | 50 | 50 | 50 | 50 |
| Stearic acid*[7] | 1 | 1 | 1 | 1 | — |
| sulfur | 0.53 | 0.53 | 1.5 | 1.5 | — |
| Vulcanization accelerator (DM)*[8] | 1.05 | 1.05 | 0.5 | 0.5 | — |
| Vulcanization accelerator (TOTN)*[9] | — | — | 1 | 1 | — |
| Zinc white | 3 | 3 | 5 | 3 | — |
| Organic peroxide*[10] | — | — | — | — | 5 |
| Evaluated physical properties Rheometer test | | | | | |
| MH[N·m] | 0.646 | 0.606 | 0.828 | 0.821 | 0.637 |
| ML[N·m] | 0.254 | 0.226 | 0.215 | 0.129 | 0.04 |
| T5[min] | 1.9 | 1.3 | 6.1 | 1.9 | 11.2 |
| T10[min] | 2.6 | 1.7 | 7.2 | 2.4 | 12.5 |
| T30[min] | 3.9 | 2.5 | 9.5 | 4.3 | 15.6 |
| T50[min] | 4.6 | 3.1 | 13.1 | 7.7 | 18.3 |
| T95[min] | 12.0 | 50.7 | 48.4 | 34.0 | 28.5 |
| Pre-aging tensile test | | | | | |
| M100 | 1.5 | 1.3 | 1.3 | 2.1 | 2.8 |
| M200 | 3.6 | 3.0 | 2.8 | 4.7 | 7.1 |
| M300 | 6.5 | 5.3 | 4.8 | 7.2 | 0.0 |
| TB[MPa] | 11.7 | 10.2 | 14.9 | 11.4 | 7.6 |
| EB[%] | 664 | 622 | 750 | 514 | 214 |
| Post-aging tensile test | | | | | |
| M100 | 1.9 | 1.6 | 1.7 | 2.6 | 3.2 |
| M200 | 4.6 | 3.9 | 4.0 | 5.9 | 7.2 |
| M300 | 7.3 | 6.4 | 6.3 | 8.3 | — |
| TB[MPa] | 10.4 | 10.4 | 12.1 | 10.5 | 7.9 |
| EB[%] | 539 | 557 | 614 | 426 | 207 |
| Holding rate EB (%) before and after aging test | 81 | 90 | 82 | 83 | 97 |

Note of Table II
*[1]Brominated butyl rubber (made by LANXESS RUBBER, BROMOBUTYL X2)
*[2]Chlorinated butyl rubber (made by Exxon Mobile, CHLOROBUTYL 1066)
*[3]Butyl rubber (made by Bayer, BUTYL 301)
*[4]Ingredient before addition of ethylene dimethacrylate in Preparation Example 1 used.
*[5]Synthesized product of Preparation Example 2
*[6]DIABLACK GPF (made by Mitsubishi Chemical)
*[7]BEADS STEARIC ACID YR (made by NOF Corporation)
*[8]NOCCELAR DM (made by Ouchi Shinko Chemical)
*[9]NOCCELAR TOT-N (made by Ouchi Shinko Chemical)
*[10]PERCUMYL D (made by NOF Corporation)

Preparation of Modified IIR Composition (OHT-IIR)

350.0 g of IIR, 30.4 g of di-t-butylperoxide and 32.2 g of OH-TEMPO were charged into an internal Banbury mixer set to a temperature of 60° C. and mixed for 10 minutes. The mixture obtained was mixed in an internal Banbury mixer set to a temperature of 100° C. and was substituted with nitrogen for 5 minutes. While mixing, the temperature was increased to 186° C. and the mixing continued for 20 minutes. Part of the polymer obtained was dissolved in toluene and a reprecipitation operation used to isolate and purify the polymer. The purified product was used for analysis by $^1$H-NMR, whereby it was confirmed that TEMPO sites were introduced (alkoxyamino groups). The introduction rate was 0.348 mol %.

Example 4 and Comparative Examples 7 to 8

The formulations shown in Table III (parts by weight) were mixed by 150 cc kneaders for 6 minutes. 8-inch open rolls were used for further mixing to obtain rubber compositions which were then press vulcanized under conditions of 170° C.×40 minutes to form 2 mm thick sheets. No. 3 dumbbell shaped test pieces were punched out from the sheets and subjected to a tensile test according to a method of JIS K6251 at a speed of 500 mm/min. The results are shown in Table III.

Measurement of Cross-Linking Curves

Figure 3:
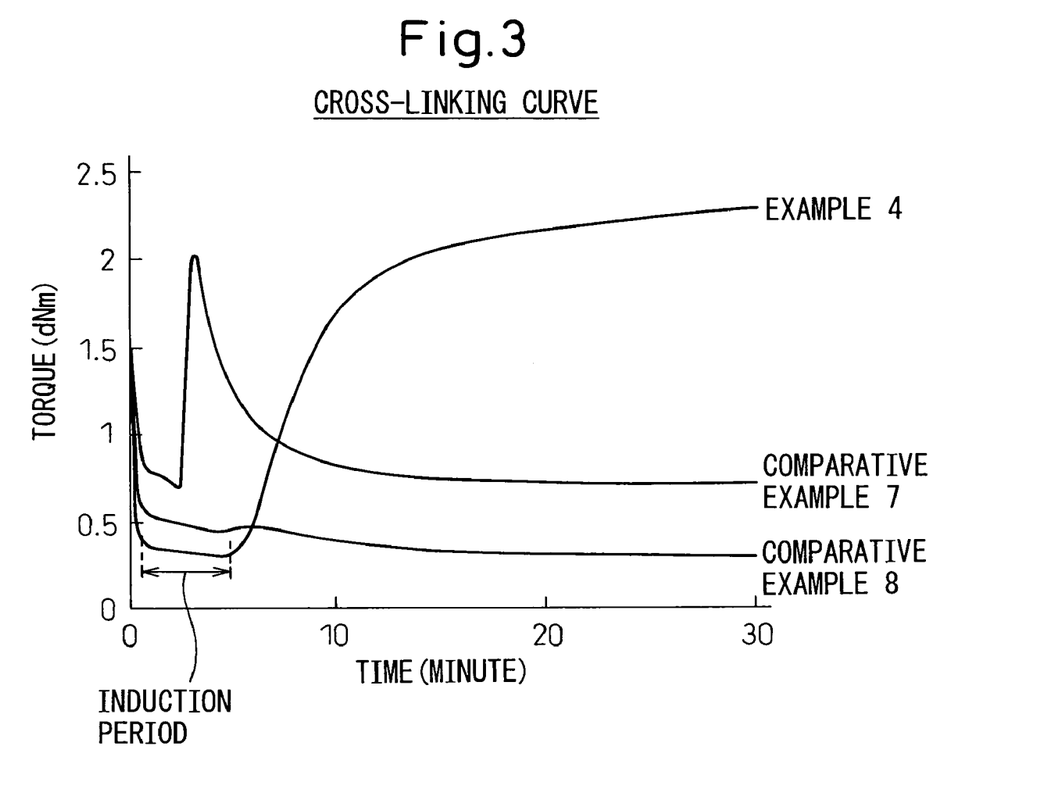
FIG. 3 is cross-linking curves showing the cross-linking characteristics of rubber compositions obtained by Example 4 and Comparative Examples 7 and 8.

The rubber compositions of Example 4 and Comparative Examples 7 to 8 were evaluated for cross-linking properties by using a "FLAT DIE RHEOMETER MODEL VR-3110 (Uejima Seisakusho)" and measuring the cross-linking curve under conditions of a vibration angle of ±1° and a temperature of 170° C. (FIG. 3).

TABLE III

|  | Comp. Ex. 7 | Comp. Ex. 8 | Ex. 4 |
|---|---|---|---|
| Formulation (parts by weight) | | | |
| Reg-IIR*[1] | 100 | — | — |
| OHT-IIR*[2] | — | 116.7*[8] | 116.7*[8] |
| Carbon black*[3] | 40 | 40 | 40 |
| Stearic acid*[4] | 1 | 1 | 1 |
| OH-TEMPO*[5] | 2.48 | — | — |
| DCP*[6] | 8 | 8 | 8 |
| TMPT*[7] | 12.02 | — | 12.02 |
| Evaluated physical properties | | | |
| Condition of cross-linked rubber sheet | Sheet cannot be formed | Sheet cannot be formed | Sheet can be formed |
| Tensile strength at break (MPa) | — | — | 3.81 |
| Elongation at break (%) | — | — | 387 |

Note of Table III
*[1]Butyl rubber (made by Bayer, BUTYL 301)
*[2]Synthesized by preparation example
*[3]ASAHI#50: made by Asahi Carbon
*[4]BEADS STEARIC ACID YR: made by NOF Corporation
*[5]4-hydroxy-2,2,6,6-tetramethylpiperidinyl-1-oxyl: made by Asahi Denka, LA7RD
*[6]Dicumyl peroxide: made by NOF Corporation, PERCUMYL D
*[7]Trimethylolpropane trimethacrylate: made by Tokyo Kasei
*[8]Prepared so that rubber ingredient becomes 100 phr

INDUSTRIAL APPLICABILITY

As explained above, according to the present invention, by reacting an ordinary butyl rubber with a TEMPO derivative or other compound having, in its molecule, a nitroxide free radical stable at an ordinary temperature in the presence of oxygen (a), a radical initiator (b) and a bi- or more-functional radical polymerizable monomer (c), or compounding said radical polymerizable monomer (c) into a butyl rubber modified using said nitroxide free radical compound (a) and radical initiator (b), it is possible to obtain a modified butyl rubber composition capable of being cross-linked with an organic peroxide and further it is possible to increase the tan δ of the butyl rubber over a broad temperature and frequency range and to improve the damping property, and therefore the composition can be used as products excellent in heat resistance and low compressive set such as tire tubes, auto parts, curing bags, drug caps, hoses, rubber vibrator dampers, cables, electrical components, sealants for electrical components, etc.

The invention claimed is:

1. A modified butyl rubber composition comprising a graft-modified butyl rubber obtained by modifying a butyl rubber by reacting the same with a compound (a) having, in the molecule thereof, a nitroxide free radical, which is stable at an ordinary temperature in the presence of oxygen, a radical initiator (b) and a bi- or more-functional radical polymerizable grafting monomer (c), whereby the bi- or more-functional radical polymerizable grafting monomer (c) is grafted onto the butyl rubber.

2. A modified butyl rubber composition as claimed in claim 1, wherein the ingredients (a) and (b) are first added to butyl rubber for the reaction and then the ingredient (c) is added for the graft-modification.

3. A modified butyl rubber composition as claimed in claim 1, wherein said bi- or more-functional radical polymerizable grafting monomer (c) is a monomer having an electron attractive group.

4. A modified butyl rubber composition as claimed in claim 1, further comprising 5 to 300 parts by weight of a reinforcing filler, based upon 100 parts by weight of the rubber ingredient including the modified butyl rubber.

5. A modified butyl rubber composition as claimed in claim 1, further comprising 0.05 to 15 parts by weight of a cross-linking agent, based upon 100 parts by weight of the rubber ingredient including the modified butyl rubber.

6. A modified butyl rubber composition as claimed in claim 5, wherein said cross-linking agent is an organic peroxide.

7. A modified butyl rubber composition as claimed in claim 6, wherein, in a cross-linking curve of a change over time of viscosity obtained at a cross-linking temperature, there is a period of a certain time interval where the viscosity does not increase at the beginning of the start of cross-linking.

8. A method for improving a damping property by increasing a tan δ of a butyl rubber cross-linked product using a modified butyl rubber composition according to claim 1.

9. A modified butyl rubber composition comprising (i) a modified butyl rubber obtained by reacting a compound (a) having, in the molecule thereof, a nitroxide free radical, which is stable at an ordinary temperature in the presence of oxygen and a radical initiator (b) and (ii) a bi- or more-functional radical polymerizable grafting monomer (c) compounded to the modified butyl rubber (i).

10. A modified butyl rubber composition as claimed in claim 9, wherein said bi- or more-functional radical polymerizable grafting monomer (c) has an electron attractive group.

11. A modified butyl rubber composition comprising (i) a modified butyl rubber composition according to claim 9 and a cross-linking agent.

12. A modified butyl rubber composition as claimed in claim 9, wherein 0.05 to 15 parts by weight of a cross-linking agent, based upon 100 parts by weight of the rubber ingredient including the graft-modified butyl rubber is contained.

13. A modified butyl rubber composition as claimed in claim 9, wherein 5 to 300 parts by weight of a reinforcing filler, based upon 100 parts by weight of the rubber ingredient is contained.

14. A modified butyl rubber composition as claimed in claim 11, wherein said cross-linking agent is an organic peroxide.

15. A modified butyl rubber composition as claimed in claim 14, wherein in a cross-linking curve of a change over time of viscosity obtained at a cross-linking temperature, there is a period of a certain time interval where the viscosity does not increase at the beginning of the start of cross-linking.

16. A method for improving a damping property by increasing a tan δ of a butyl rubber cross-linked product using a modified butyl rubber composition according to claim 9.

17. A modified butyl rubber composition as claimed in claim 13, which further contains a cross-linking agent and wherein said cross-linking agent is an organic peroxide.

18. A modified butyl rubber composition as claimed in claim 17, wherein in a cross-linking curve of a change over time of viscosity obtained at a cross-linking temperature, there is a period of a certain time interval where the viscosity does not increase at the beginning of the start of cross-linking.

* * * * *